3,195,161
WINDSHIELD WIPER DE-ICER
Edward Haluck, 826½ Gaskill Ave.; Stanley C. Haluck, R.D. 2; and Henry J. Haluck, Central Hotel, 3rd and Magee, all of Jeannette, Pa.
Filed Oct. 28, 1963, Ser. No. 319,098
1 Claim. (Cl. 15—250.06)

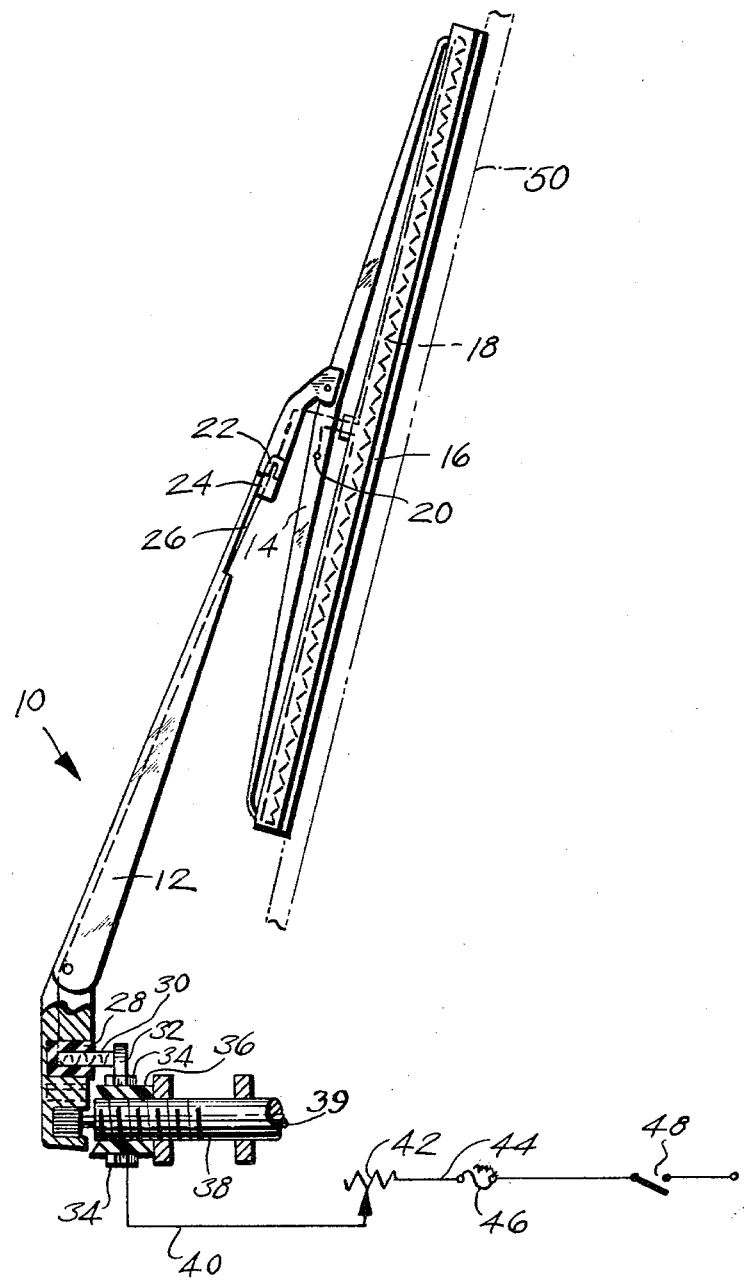

This invention relates to de-icing devices and more particularly to a windshield de-icer wiper for motor vehicles.

It is a primary object of the present invention to provide a windshield wiper de-icer which will have a heating element within the wiper blade which will be electrically connected to the vehicle's electrical system.

Other objects of the invention are to provide a windshield de-icer bearing the above objects in mind which is of simple construction, has a minimum number of parts, is inexpensive to manufacture and efficient in operation and use.

For other objects and for a better understanding of the invention, reference may be had to the following detailed description taken in connection with the accompanying drawing, in which the device is illustrated by a single figure which is the sole view of the present invention.

Referring now more in detail to the drawing, a windshield wiper de-icer made in accordance with the present invention and identified by the numeral 10 is shown to include a wiper arm 12 which is pivotably secured to wiper 14, having a rubber blade 16. A heating element 18 is molded into wiper blade 16. An electrical contact 20 is secured to one end of heating element 18 and provides a means of connecting heating element 18 to one side of the electrical circuit. The other side of heating element 18 extends into the upper portion of arm 12 and is secured to a female plug 22 which slidably receives a male plug 24 which is secured to an insulated wire 26 extending down through arm 12. Wire 26 is received within a rubber bushing 28 in the lower extremity of arm 12 and a brush which is spring-loaded, and identified by the numeral 30 is secured within bushing 28 and is in sliding engagement with a metal contact member 32 which is secured by lock nuts 34 on the exterior of nylon block 36. Nylon block 36 is received on the wiper support 38 which mounts the operating means 39 and an electrical connection between disc 32 and wire 40 extends to a control rheostat 42. The other side of rheostat 42 is electrically connected to an insulated wire 44 having a fuse 46 and a switch 48 in series with it.

In operation, when switch 48 is closed, the vehicle circuit provides electricity through the wiper support by means of the sliding brush 30 to the lower extremity of arm 12 and thus the heating element within the wiper blade 16 melts any ice present upon the windshield 50.

It shall be noted that all the wires heretofore mentioned are insulated and wire 26 may be removed by removing the male plug 24 from within female plug 22, providing easy interchangeability of blades 16.

While various changes may be made in the detail construction, it shall be understood that such changes shall be within the spirit and scope of the present invention as defined by the appended claim.

What we claim as new and desire to protect by Letters Patent of the United States is:

In an electrically heated type windshield wiper construction, in combination, a relatively stationary support having mechanical operating means extending therethrough, a wiper arm mounted at its lower end on said operating means, an electrically heated windshield wiper carried by the upper end of said arm, a spring loaded brush carried by and insulated from the lower end of the wiper arm and electrically connected to the windshield wiper, and a current supply contact member mounted on and insulated from the stationary support in engagement with said spring loaded brush.

References Cited by the Examiner
UNITED STATES PATENTS

| | | | |
|---|---|---|---|
| 2,119,587 | 6/38 | Lamb | 15—250.09 |
| 2,656,448 | 10/53 | Lentz | 15—250.06 |
| 2,721,351 | 10/55 | Nitzel et al. | 15—250.06 |
| 2,755,499 | 7/56 | Mays | 15—250.06 |

CHARLES A. WILLMUTH, *Primary Examiner.*